Dec. 21, 1937.  G. A. PETROE  2,103,118
VACUUM VALVE
Filed Feb. 29, 1936
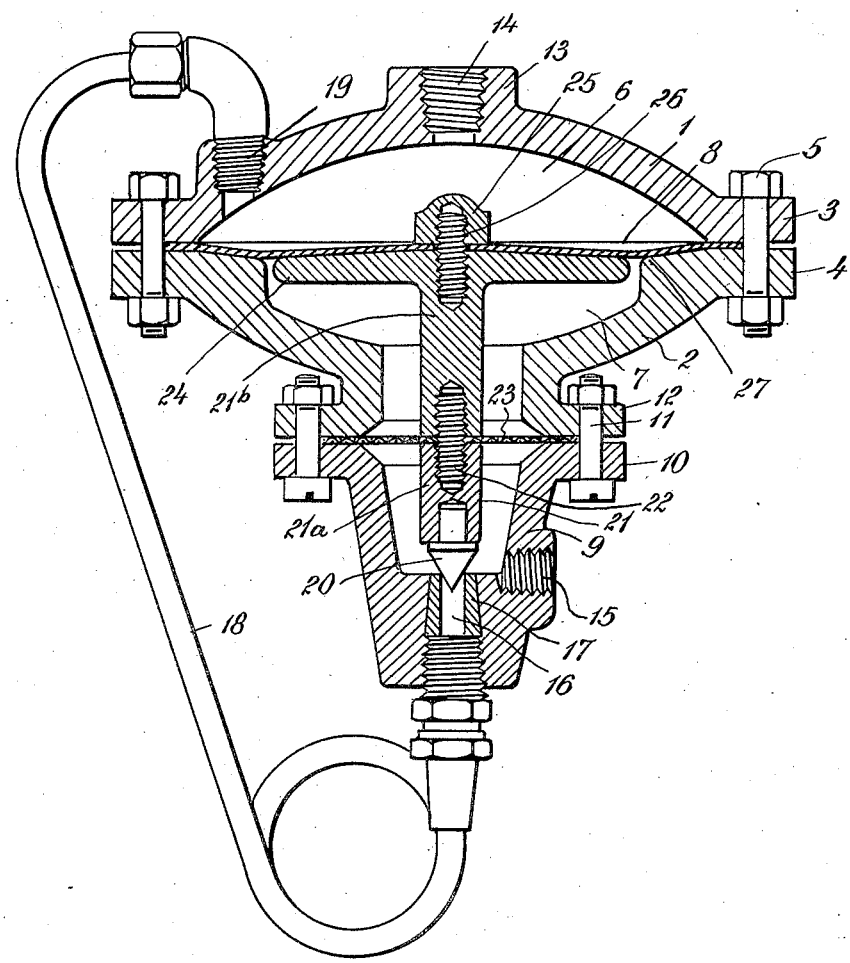
INVENTOR
Gregory A. Petroe
BY
Pennie Davis Marvin Edmonds
ATTORNEYS Patented Dec. 21, 1937

2,103,118

UNITED STATES PATENT OFFICE 2,103,118

VACUUM VALVE

Gregory A. Petroe, Niagara Falls, N. Y., assignor to The Mathieson Alkali Works, Inc., New York, N. Y., a corporation of Virginia Application February 29, 1936, Serial No. 66,410

9 Claims. (Cl. 137—153)

This application is a continuation-in-part of my application for Safety valves, Serial No. 727,753, filed May 26, 1934.

This invention relates to valves, and is concerned more particularly with a novel valve of the uni-flow type which may be advantageously employed for automatically preventing the maintenance of sub-atmospheric pressures in a fluid system. The new valve is simple and durable in construction and reliable in operation, requires no attention or adjustment during operation, is suitable for use over a wide range of operating conditions, and may be employed in connection with systems containing a corrosive gas at relatively high pressures and may, at the same time, be made highly sensitive.

The new valve is particularly useful in connection with fluid systems in which the maintenance of the pressure of the fluid at a value below a selected value, such as atmospheric, is to be prevented, as, for example, in the system for chlorinating water covered by the Savell U. S. Patent No. 2,012,406, issued August 27, 1935. In the Savell system, a sub-atmospheric pressure may result from removal of chlorine from the system by absorption of that gas in the water undergoing treatment. The creation of a partial vacuum in the patented system under the conditions mentioned is undesirable, and the new valve may be used in connection with that system to permit the admission of air whenever the system pressure drops below the desirable minimum, in this case, atmospheric, the valve functioning to close the system as soon as the pressure is at or above the desired minimum.

For purposes of explanation, an embodiment of the principles of the invention in a form suitable for use in a system of the Savell type is illustrated and described, but it is to be understood that the utility of the invention is not limited to that particular form, and with some changes, the new valve may be adjusted so that it functions under other conditions than those mentioned, as, for example, the valve may normally maintain the system open and closed upon the development in the system of a pressure in excess of a selected value. Also, the new valve may be modified to respond to pressures selected within a substantial range, according to the conditions under which it is to operate.

The new valve includes a housing which is divided into a pair of chambers by a diaphragm, one of these chambers being connected to the system, while the other chamber is open to the atmosphere. The chambers are connected by a conduit, and flow through the conduit is controlled by a normally closed valve, the movable member of which is operatively connected to the diaphragm and lies in the chamber open to atmosphere. Upon the development of a sub-atmospheric pressure in the system, the control valve is opened by a movement of the diaphragm, and atmosphere enters the second chamber, passes through the conduit into the first chamber, and thence enters the system. When the system pressure is restored to atmospheric, the diaphragm returns to its normal position in which the valve is closed, and the valve remains closed so long as the system pressure is at or above atmospheric.

In order that such a vacuum breaking valve may function properly to open the Savell system to atmosphere under the conditions mentioned, the diaphragm must be of considerable area, and since the system contains chlorine, which is highly corrosive, it is necessary to employ a diaphragm made of a material, such, for example, as fine silver, which is not subject to chlorine attack. The pressure in the Savell system frequently rises as high as 150 lbs. per sq. in., and an ordinary diaphragm would have to be of substantial thickness to withstand the pressures to which it is exposed. A diaphragm of that thickness, however, is so stiff and unyielding as to render the valve insensitive, and it has, therefore, been a serious problem heretofore to provide a valve in which the diaphragm has the desired strength, resistance to corrosion, and sensitivity.

The present invention is, accordingly, directed to the provision of a novel vacuum breaking valve of the type described, which may be used with systems containing corrosive fluids at relatively high pressures and is highly sensitive and this object is accomplished in the new valve by so constructing the valve that the diaphragm is almost fully supported on one face. With this arrangement, a thin sensitive diaphragm may be employed, and the danger of rupturing the diaphragm is reduced to a minimum.

For a better understanding of the invention, reference may be made to the accompanying drawing, in which the single figure is a view in longitudinal cross-section of one form of the new valve.

The valve as illustrated in the drawing comprises a housing formed in part by an upper housing member 1 and an intermediate housing member 2, these members being provided generally circular in plan and with circumferential flanges 3 and 4, respectively, which are secured together by bolts 5. The housing is divided into an upper chamber 6 and a lower chamber 7 by means of a diaphragm 8 which lies between the housing members 1 and 2 with its edge clamped between flanges 3 and 4. This diaphragm may be made of any suitable material, but when the vacuum breaking valve is to be employed in connection with a system which contains a corrosive fluid, the diaphragm must be of a material which will withstand the attack of that fluid. For use with systems containing chlorine, the diaphragm may be of various materials, such as fine silver and various alloys. The housing is completed by a lower housing member 9 provided with a flange 10 secured by bolts 11 to a similar flange 12 at the lower end of the intermediate housing member 2.

The upper housing member is provided with a boss 13 having a tapped port 14 by which the upper chamber 6 may be connected to the fluid system, and the lower housing member 9 has a similar port 15 by which the lower chamber 7 is open to the atmosphere. A second port 16 is formed in the wall of the lower housing member, and within the port is a tubular valve seat member 17. The port 16 is connected by a suitable passage 18 to the port 19 in the wall of the upper chamber 6 and this passage may be formed in any suitable way, as, for example, by suitable tubes and fittings or of cored cast iron.

A movable valve member 20 within the lower housing member cooperates with the valve seat 17, the member 20 being mounted on a stem 21 which is in two parts 21a and 21b connected together by a suitable threaded stud 22. The adjacent ends of the parts 21a, 21b clamp the inner edge of the flexible guide member 23 which may take the form of a disc of wire mesh material, the outer edge of the disc being clamped between the flanges 10 and 12 on the lower end intermediate housing members. The upper end of the valve stem member 21b is provided with an enlarged head 24 of flattened dome shape, which is in contact with the lower surface of the diaphragm 8, and the stem is secured to the diaphragm by means of a cap 25 contacting with the upper face of the diaphragm and clamping the diaphragm between it and the head 24. The cap is held in place by a threaded stud 26 which passes through an opening in the diaphragm and enters tapped openings in the stem and in the cap.

The enlarged head 24 on the stem provides support for a considerable proportion of the area of the diaphragm, and further support is provided by an annular shoulder or ledge 27 formed on the inner surface of the intermediate housing member at its upper end. This shoulder extends inward from the flange 4 substantially to the periphery of the head 24, sufficient space for clearance being provided between the head and the shoulder. The upper surface of the shoulder slopes downward slightly from the upper surface of the flange 4, and the upper surface of the head adjacent the flange lies in about the same level.

With the arrangement described, the admission of fluid under pressure through the port 14 into the upper diaphragm chamber 6 causes the diaphragm to move into contact with the upper surface of the annular shoulder 27, and the pressure applied to the diaphragm causes the movable valve member 20 to be forced firmly against the upper end of its seat 17. This closes the passage 18 from the upper chamber to the lower one, and escape of fluid from the system through the vacuum breaking valve is prevented. When the pressure in the system falls below atmospheric, the diaphragm is raised to open the valve 17, 20, and air enters the lower chamber through the port 15 and flows through the valve 17, 20, the passage 18, and upper chamber 6, and the port 14 into the system. As soon as the pressure in the system reaches atmospheric, the valve member 20 is again seated, and the system is thereby shut off from the atmosphere.

In the vacuum breaking valve constructed as described, the diaphragm may be of thin material, thus highly sensitive, because substantially the entire diaphragm is supported by the valve stem head 24, and the shoulder 27 in the intermediate housing member. The only unsupported portion of the diaphragm is that in registry with the clearance space between the head and the shoulder, and the structural properties required of the diaphragm to resist destruction under pressure are merely those necessary to overcome the shearing effect in the clearance space referred to. By making the shoulder with the sloping upper surface and forming the head of the valve stem as illustrated, the application of pressure to the upper surface of the diaphragm has the effect of forcing the diaphragm down against the supporting members, and the diaphragm takes permanent set, so that it holds the movable valve member 20 normally in contact with its seat 17 without the use of weights, springs, etc. The movable valve member is guided in its movement toward and from the seat by the perforated diaphragm disc 23, and this disc may be highly flexible so that it in no way impairs the sensitivity of the device.

By reason of the support provided for the diaphragm of the new valve, the device may be constructed so that it can be used with systems containing fluids at pressures as high as 150 lbs. per sq. in., and at the same time, the diaphragm is sensitive to low sub-atmospheric pressures of the order of magnitude of about 1½" to 2" water column suction. The device thus serves the desired purpose and makes possible the use of a sensitive vacuum breaking valve in connection with systems containing corrosive fluids at relatively high pressures.

While I have described the diaphragm mechanism as employed in a vacuum breaking valve, it will be understood that the mechanism may be advantageously used in various other devices in which it is desired to employ a diaphragm which is sensitive and which is at the same time capable of withstanding relatively high pressures. The diaphragm mechanism, therefore, forms an important feature of my invention.

I claim:

1. A safety valve for preventing the development of a sub-atmospheric pressure in a system, which comprises a housing, resilient diaphragm means having substantially the same effective area at each side sub-dividing the housing into a pair of chambers, each chamber being provided with a port, one port adapted to be connected to the system and the other open to the atmosphere, a passage independent of said ports and leading from one chamber to the other, valve means controlling said passage and including a movable valve member and a valve seat, said movable valve member having a stem with a head contacting with the diaphragm means, a connection between said diaphragm means and said stem, said diaphragm means under normal operating conditions acting through said connection to maintain said valve member on its seat to close said passage, and means formed on the inner wall of said housing for engaging said diaphragm means, said head and said last-mentioned means supporting the diaphragm means throughout substantially the entire area of one face thereof when the movable valve member is seated.

2. A safety valve for preventing the development of a sub-atmospheric pressure in a system, which comprises a housing, resilient diaphragm means having substantially the same effective area at each side sub-dividing the housing into a pair of chambers, each chamber being provided with a port, one port adapted to be connected to the system and the other open to the atmosphere, a passage independent of said ports and leading from one chamber to the other, valve means controlling said passage and including a movable valve member and a valve seat, said movable valve member having a stem with a head contacting with the diaphragm means, a connection between said diaphragm means and said stem, said diaphragm means under normal operating conditions acting through said connection to maintain said valve member on its seat to close said passage, and an annular shoulder on the inner wall of said housing encircling said head, said head and shoulder providing support for said diaphragm means over substantially the entire area of one face thereof when said movable valve member is seated.

3. A safety valve for preventing the development of a pressure below atmospheric in a system, which comprises a housing, resilient diaphragm means having substantially the same effective area at each side sub-dividing the housing into a pair of chambers, each chamber being provided with a port, one port adapted to be connected to the system and the other open to atmosphere, a passage independent of said ports and leading from one chamber to the other, a valve in the atmospheric chamber for controlling said passage, said valve including a movable valve member and a seat, a stem on which the movable valve member is mounted, said stem having a head in contact with the face of the diaphragm means exposed to atmosphere and being connected to said diaphragm means, said diaphragm means under normal operating conditions acting through said stem to maintain said valve member on its seat to close said passage and means in said atmospheric chamber engageable by said diaphragm means, said means and said head supporting said diaphragm means over substantially the entire area of the face thereof exposed to atmosphere when said control valve is closed.

4. A safety valve for preventing the development of a pressure below atmospheric in a system, which comprises a housing, resilient diaphragm means having substantially the same effective area at each side sub-dividing the housing into a pair of chambers, each chamber being provided with a port, one port adapted to be connected to the system and the other open to atmosphere, a passage independent of said ports and leading from one chamber to the other, a valve in the atmospheric chamber for controlling said passage, said valve including a movable valve member and a seat, a stem on which the movable valve member is mounted, said stem having a head in contact with the face of the diaphragm means exposed to atmosphere and being connected to the diaphragm means, said diaphragm means under normal operating conditions acting on said stem to cause said movable valve member to engage its seat and close said passage and an annular shoulder on the wall of said housing in the atmospheric chamber, said shoulder being engageable by said diaphragm means and, together with said head, supporting said diaphragm means over substantially the entire area of the face thereof exposed to atmosphere when said movable valve member is seated.

5. A safety valve for preventing the development of a sub-atmospheric pressure in a system, which comprises a housing, resilient metallic diaphragm means having substantially the same effective area at each side sub-dividing the housing into a pair of chambers, each chamber being provided with a port, one port adapted to be connected to the system and the other open to the atmosphere, a passage independent of said ports and leading from one chamber to the other, a valve in the atmospheric chamber for controlling said passage, said valve including a movable member and a seat, a stem on which said movable member is mounted, said stem having a head in contact with the face of the diaphragm means exposed to atmosphere and being connected to the diaphragm means, said diaphragm means under normal operating conditions acting on said head to maintain said valve member in contact with its seat to close said passage, and means in said housing engageable by the diaphragm means and, together with the head, supporting said diaphragm means over substantially the entire area of the face of the diaphragm means exposed to atmosphere, said diaphragm means having a set whereby it normally holds said movable member against its seat.

6. A safety valve for preventing the development of a sub-atmospheric pressure in a system, which comprises a housing, resilient metallic diaphragm means having substantially the same effective area at each side sub-dividing the housing into a pair of chambers, each chamber being provided with a port, one port adapted to be connected to said system and the other open to atmosphere, a passage independent of said ports and connecting the chambers, a valve in the atmospheric chamber for controlling said passage, said valve including a movable valve member and a seat, a stem on which said movable member is mounted, said stem having a head contacting with the face of the diaphragm means exposed to atmosphere and being connected to the diaphragm means, and a surface on the inner wall of said housing engageable by the face of the diaphragm means exposed to the atmosphere and, together with said head, supporting the diaphragm means over substantially the entire area of the face of the diaphragm means exposed to atmosphere, said diaphragm means having a permanent set whereby it maintains the valve member seated under normal operating conditions.

7. A safety valve for preventing the development of a sub-atmospheric pressure in a system, which comprises a housing including a pair of housing members, and resilient diaphragm means having substantially the same effective area at each side between said members and with the latter defining a pair of chambers, said chambers being secured together with the edge of the diaphragm means between them, a port in one member for connecting one chamber to the system, a port for admitting atmosphere into the second chamber, a passage independent of said ports and leading from one chamber to the other, a valve in the atmospheric chamber for controlling said passage, said valve including a movable valve member and a valve seat, a stem on which the movable valve member is mounted, said stem having a head contacting with the face of the diaphragm means exposed to atmosphere and being connected to said diaphragm means, said diaphragm means under normal operating conditions acting on said stem to cause said valve member to engage its seat and close said passage, and means on one of said housing members surrounding said head and engageable by the face of said diaphragm means exposed to atmosphere, said means and said head cooperating to support said diaphragm means over substantially the entire area of said face thereof when said valve member is seated 8. A safety valve for preventing the development of a sub-atmospheric pressure in a system, which comprises a housing including a pair of housing members, and resilient diaphragm means having substantially the same effective area at each side between said members and with the latter defining a pair of chambers, said members being secured together with the edge of the diaphragm means between them, a port in one member for connecting one chamber to the system, a port for admitting atmosphere into the second chamber, a passage independent of said ports and leading from one chamber to the other, a valve in the atmospheric chamber for controlling said passage, said valve including a movable valve member and a valve seat, a stem on which the movable valve member is mounted, said stem having a head contacting with the face of the diaphragm means exposed to atmosphere and being connected to said diaphragm means, said diaphragm means under normal operating conditions acting on said stem to maintain said valve member on its seat to close said passage, and an annular shoulder formed on one of the housing members outside said head and engageable by said diaphragm means, said head and shoulder cooperating to support the diaphragm means over substantially the entire face thereof exposed to atmosphere when said valve member is seated.

9. In a valve device for preventing the development of a sub-atmospheric pressure in a system, the combination of a housing, resilient diaphragm means having substantially the same effective area at each side sub-dividing the housing into a pair of chambers, one adapted to be connected to the system and the other open to atmosphere, a passage independent of said ports and leading from one chamber to the other, a valve controlling said passage and comprising a movable valve member and a valve seat, a stem on which said movable valve member is mounted, said stem having an enlarged head in contact with one face of the diaphragm means, and an annular shoulder on said housing in contact with said face of the diaphragm means, said shoulder being inclined to a plane transverse to the axis of said stem, the inner edge of said shoulder lying close to the outer edge of said head, and said diaphragm means being formed of metal and having a permanent set such that one face of said diaphragm means lies in contact with said shoulder under normal operating conditions and said diaphragm means maintains said valve member on its seat to close said passage.

GREGORY A. PETROE.